(12) United States Patent
Li et al.

(10) Patent No.: US 9,468,911 B2
(45) Date of Patent: Oct. 18, 2016

(54) CATALYST FOR PREPARING CHIRAL SELECTIVE AND CONDUCTIVE SELECTIVE SINGLE-WALLED CARBON NANOTUBE, PREPARATION METHOD AND APPLICATION THEREOF

(71) Applicant: PEKING UNIVERSITY, Beijing (CN)

(72) Inventors: Yan Li, Beijing (CN); Feng Yang, Beijing (CN); Fei Peng, Beijing (CN); Juan Yang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 14/414,098

(22) PCT Filed: Jul. 10, 2013

(86) PCT No.: PCT/CN2013/000830
§ 371 (c)(1),
(2) Date: Jan. 10, 2015

(87) PCT Pub. No.: WO2014/008756
PCT Pub. Date: Jan. 16, 2014

(65) Prior Publication Data
US 2015/0209763 A1    Jul. 30, 2015

(30) Foreign Application Priority Data

Jul. 12, 2012 (CN) .......................... 2012 1 0241640

(51) Int. Cl.

| | | |
|---|---|---|
| *B01J 23/888* | (2006.01) | |
| *C01B 31/02* | (2006.01) | |
| *B01J 23/34* | (2006.01) | |
| *B01J 23/30* | (2006.01) | |
| *B01J 37/08* | (2006.01) | |
| *B01J 37/18* | (2006.01) | |
| *B01J 23/889* | (2006.01) | |
| *B01J 23/36* | (2006.01) | |
| *B01J 23/652* | (2006.01) | |
| *B01J 23/89* | (2006.01) | |
| *B82Y 40/00* | (2011.01) | |

(52) U.S. Cl.
CPC .............. *B01J 23/888* (2013.01); *B01J 23/30* (2013.01); *B01J 23/34* (2013.01); *B01J 23/36* (2013.01); *B01J 23/6527* (2013.01); *B01J 23/8892* (2013.01); *B01J 23/8993* (2013.01); *B01J 37/08* (2013.01); *B01J 37/18* (2013.01); *C01B 31/0233* (2013.01); *B82Y 40/00* (2013.01); *C01B 2202/02* (2013.01); *C01B 2202/22* (2013.01)

(58) Field of Classification Search
CPC ... B01J 23/888; B01J 23/34; C01B 31/0233; C01B 2202/02; C01B 2202/22
See application file for complete search history.

(56) References Cited

U.S. PATENT DOCUMENTS

| | | | |
|---|---|---|---|
| 2006/0104890 A1* | 5/2006 | Harutyunyan ......... | B82Y 30/00 423/447.3 |
| 2007/0189953 A1* | 8/2007 | Bai ....................... | B82Y 30/00 423/414 |

OTHER PUBLICATIONS

Feng Yang et, al. Chirality-specific growth of single-walled carbon nanotubes on solid alloy catalysts. Nature 510, 522-524, Jun. 26, 2014: First column, line 10-15 in p. 52.

* cited by examiner

*Primary Examiner* — Daniel C McCracken
(74) *Attorney, Agent, or Firm* — CBM Patent Consulting, LLC (57) ABSTRACT

It relates to a type of catalysts for preparation of chirality-selective and conductivity-selective single-walled carbon nanotubes. The catalysts have chemical compositions of $AB_y$, wherein A is the metal tungsten (W), B stands for one or more metals selected from a group consisting of the transition metals manganese, iron, cobalt, copper, zinc, chromium, vanadium, rhodium, ruthenium, palladium, platinum, gold, silver, osmium, iridium, and the lanthanide rare earth metals, and y is in the range of 0.01-20.0. This catalyst can be used to catalyze the growth of single-walled carbon nanotubes with desired chirality and conductivity.

7 Claims, 6 Drawing Sheets

CATALYST FOR PREPARING CHIRAL SELECTIVE AND CONDUCTIVE SELECTIVE SINGLE-WALLED CARBON NANOTUBE, PREPARATION METHOD AND APPLICATION THEREOF

This application is the U.S. national phase of International Application No. PCT/CN2013/000830 filed on 10 Jul. 2013 which designated the U.S. and claims priority to Chinese Application No. 201210241640.2 filed on 12 Jul. 2012, the entire contents of each of which are hereby incorporated by reference.

FIELD OF THE INVENTION

The present invention relates to single-walled carbon nanotubes, more particularly, to catalysts for preparation of chirality-selective and conductivity-selective single-walled carbon nanotubes, preparation methods and applications thereof.

BACKGROUND OF THE INVENTION

As a typical nanomaterial, carbon nanotubes, especially single-walled carbon nanotubes, are the focus of current research due to the remarkable properties.

Single-walled carbon nanotube (SWNTs) is a typical one-dimensional nanomaterial with high length-to-diameter ratio. The special cylindrical structure with high length-to-diameter ratio rolling up from a single layer graphene determines the superior physical, chemical, electrical, and mechanical properties of single-walled carbon nanotubes, such as, very high Young's modulus, tensile strength and thermal conductivity, ideal performance as one-dimensional quantum wire and direct bandgap semiconductor, easy functionalization with other molecules, as well as good biocompatibility. Comparing to caged fullerene molecules with relatively simple structures, carbon nanotubes possess broader application prospects in many areas such as nano-electronic devices, optical devices, chemical and biological sensors, and multi-functional composite materials, etc.

Figure 1:
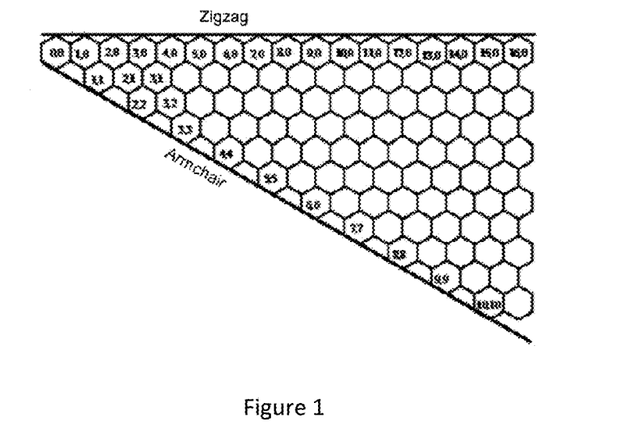
FIG. 1 is the illustrative diagram of the chirality (n,m) of single-walled carbon nanotubes rolling up along the chiral vector R from a single layer graphene.

The chiralities of single-walled carbon nanotubes, which are denoted by a pair of chiral indices (n,m) as shown in FIG. 1, are determined by the rolling up direction from the single layer graphene. Carbon nanotubes can be viewed as projections of two-dimensional graphene on a cylindrical surface, which can be made only when the circumference of the cylinder matches perfectly with a certain lattice vector R in the Brillouin zone of the graphene layer. Each lattice vector R in the Brillouin zone is composed of two unit vectors $R_1$ and $R_2$ of the graphene and a pair of integers (n,m) by: $\vec{R}=n \vec{R}_1+m \vec{R}_2$, where (n,m) defines the chirality of the single-walled carbon nanotube. It should be noted that two types of single-walled carbon nanotubes with chiral angles (θ) 0° and 30° correspond to (n,0) and (n,n), respectively, both possessing a symmetry plane and thus being achiral. The (n,0) nanotubes are termed as zigzag and (n,n) nanotubes are termed as armchair. All other single-walled carbon nanotubes except these two types are chiral. As a fundamental property of single-walled carbon nanotubes, chirality determines all physical and chemical properties of a nanotube, such as conductivity, etc. If n−m=3q and q is an integer, the single-walled carbon nanotubes are metallic, and semiconducting otherwise. Therefore, there are ⅓ (33%) metallic and ⅔ (67%) semiconducting nanotubes in the commonly prepared single-walled carbon nanotubes.

The key technology in the current research area of carbon nanotubes, which also determines the application prospects in carbon-based nanoelectronics, is the controllable preparation of high purity single-walled carbon nanotubes (SWNTs) with desired chirality, conductivity (semiconductivity or metallicity). Semiconducting single-walled carbon nanotubes can be used as fundamental units in nanoscale logic circuit, such as field effect transistors, p-n junction diode, memory devices, etc. Metallic single-walled carbon nanotubes have superior performance such as high current density tolerance, small diameter, high chemical stability, high thermal stability, etc. and are the best connecting wires in logic circuits and molecular devices. However, those applications depend to a large extent on the properties of single-walled carbon nanotubes, such as diameter, chirality, conductivity, etc. Therefore, selective growth of single-walled carbon nanotubes is very important.

Although several literatures in the prior art are available in controllable selective separation of single-walled carbon nanotubes based on physical chemical methods, the technical steps reported in those literatures are complicated and the separation results are unsatisfactory.

Currently, researchers have utilized methods such as plasma enhanced chemical vapor deposition, ultraviolet light etching, precursors doped with oxidative carbon sources, adjusting carbon sources partial pressure, etc. to directly grow single-walled carbon nanotubes with a high semiconducting content, and to obtain relatively high selectivity in metallic single-walled carbon nanotubes by adding sulfur-containing compounds in the carbon sources. However, only bulk single-walled carbon nanotubes can be obtained in those methods, and it is another big challenge, which hinders the applications in field effect transistor devices, to disperse bulk single-walled carbon nanotubes on silicon substrates. Relatively good conductivity and chirality selectivities can also be achieved by controllable growth of single-walled carbon nanotubes on substrates by the cloning method, however, the difficulty in large-scale controllable preparation limits its further applications.

In order to be applicable in the research for surface electronic devices, it is a big challenge and of important research significance to directly grow chirality-selective and conductivity-selective (i.e. semiconducting/metallic) single-walled carbon nanotubes on substrates.

CONTENTS OF THE INVENTION

In order to solve the above problems, the inventors of the present invention carry out intensive studies and find out that chirality-selective and conductivity-selective single-walled carbon nanotubes on substrates can be controllably prepared by using composition (alloy) catalysts composed of tungsten and other metals, which are reduced by hydrogen gas from compounds formed by high boiling point tungsten metal and other metals.

The first purpose of the present invention is to provide catalysts for preparation of chirality-selective and conductivity-selective single-walled carbon nanotubes, said catalysts are represented by formula (I) as follows:

$$AB_y, \qquad \text{formula (I)}$$

wherein, A is the metal tungsten (W);

B stands for one or more metals selected from a group consisting of the transition metals vanadium (V), chromium (Cr), manganese (Mn), iron (Fe), cobalt (Co), nickel (Ni), copper (Cu), zinc (Zn), rhodium (Rh), ruthenium (Ru), palladium (Pd), platinum (Pt), gold (Au), silver (Ag), rhenium (Re), osmium (Os), iridium (Ir), and the lanthanide rare earth metals;

y is in the range of 0.01-20.0.

The second purpose of the present invention is to provide a preparation method of the catalysts to grow chirality-selective and conductivity-selective single-walled carbon nanotubes, said catalysts are represented by formula (I) as above and said method comprises the following steps:

Reducing the metal oxides with chemical compositions represented by formula (II) as follows to obtain the catalysts with chemical compositions represented by formula (I) as above in the atmosphere of hydrogen at 300-1500° C. with a temperature programmed heating rate of 10-100° C./min:

$$AB_yO_{(a+by)/2}, \qquad \text{formula (II)}$$

wherein, A is the metal tungsten (W);

B stands for one or more metals selected from a group consisting of the transition metals vanadium (V), chromium (Cr), manganese (Mn), iron (Fe), cobalt (Co), nickel (Ni), copper (Cu), zinc (Zn), rhodium (Rh), ruthenium (Ru), palladium (Pd), platinum (Pt), gold (Au), silver (Ag), rhenium (Re), osmium (Os), iridium (Ir), and the lanthanide rare earth metals;

a is the oxidation number in A;

b is the oxidation number in B;

y is in the range of 0.01-20.0.

The third purpose of the present invention is to provide applications of the catalysts described above for preparation of chirality-selective and conductivity-selective single-walled carbon nanotubes.

The fourth purpose of the present invention is to provide a preparation method of chirality-selective and conductivity-selective single-walled carbon nanotubes, said method comprises the following steps:

Growing single-walled carbon nanotubes on substrates loaded with the catalysts described above by introducing carbon sources gas with a flow rate of 10-1000 ml/min at 600-1500° C., and by chemical vapor deposition.

The catalysts provided in the present invention show various advantages including nonvolatile metal components, fixed metal composition, controllable particle size, dual/multiple metal synergistic effect, etc. The facility requirement and cost are low. The selective growth of single-walled carbon nanotubes with desired chirality and conductivity can be achieved using the catalysts provided in the present invention.

DETAILED DESCRIPTION OF THE PREFERRED EMBODIMENTS

The present invention is further illustrated as follows, and the characteristics and advantages of the present invention will become more clear and explicit.

As one aspect of the present invention, catalysts for preparation of chirality-selective and conductivity-selective single-walled carbon nanotubes are provided, said catalysts have chemical compositions as represented by formula (I) as follows:

$$AB_y, \qquad \text{formula (I)}$$

wherein, A is the metal tungsten (W);

B stands for one or more metals selected from a group consisting of the transition metals vanadium (V), chromium (Cr), manganese (Mn), iron (Fe), cobalt (Co), nickel (Ni), copper (Cu), zinc (Zn), rhodium (Rh), ruthenium (Ru), palladium (Pd), platinum (Pt), gold (Au), silver (Ag), rhenium (Re), osmium (Os), iridium (Ir), and the lanthanide rare earth metals;

y is in the range of 0.01-20.0.

As for the lanthanide rare earth metals, lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) are specifically mentioned.

In a preferred embodiment, in formula (I) B stands for one or more metals selected from a group listed as follows: transition metals manganese (Mn), iron (Fe), cobalt (Co), nickel (Ni), copper (Cu), zinc (Zn), chromium (Cr), vanadium (V), rhodium (Rh), and ruthenium (Ru); more preferably, B stands for one or more metals selected from a group listed as follows: manganese (Mn), iron (Fe), cobalt (Co), nickel (Ni), copper (Cu), zinc (Zn), and chromium (Cr); most preferably, B stands for one or more metals selected from a group listed as follows: iron (Fe), cobalt (Co), nickel (Ni), copper (Cu), manganese (Mn), and chromium (Cr).

In a preferred embodiment, in formula (I) y is in the range of 0.1-6.0, preferably, 0.2-4.0, more preferably, 0.2-1.0.

As examples of the above catalysts, substances with the following chemical compositions are specifically mentioned:

Binary catalysts including WV, $WFe_{1.17}$, $WFe_2$, WFe, $WCo_{1.17}$, $WCo_3$, WCo, WNi, $WNi_4$, $WNi_{5.67}$, $WCu_{0.67}$, $WCu_{5.25}$, WRe, $WRe_3$, $WRe_{0.25}$, $WRe_{10.11}$, $W_{13}Re_7$, $WOs_{0.5}$, $WOs_2$, WIr, $WPt_2$, $WRh_3$, $WRh_4$, $WRu_{0.18}$, $WRu_{1.5}$, $WEu_{0.18}$, $WCe_3$, $WPr_3$;

Ternary catalysts including WCoNi, $WFeNi_5$, $WMn_3Fe$, $WPtNi_{10}$, $WRu_2Fe_5$, WRhCo, $WCu_2Fe_{12}$, $WFeV_4$, $WRe_{0.125}Ni_{0.125}$, $WRu_3Cu_{12}$, $WPtCu_{10}$, $WMn_{1.5}V_{0.63}$, $WLaFe_3$;

Multiple catalysts including WFeCoNi, WFeCoMn, WFeCu₃Ru, WMn₅V₃Cr, WRuPtAu, WFe$_{0.1}$Au$_{0.2}$Mn$_{0.1}$, WFeRe₂Mn, WOsCu₃Mn₈.

As the second aspect of the present invention, a preparation method of the catalysts to grow chirality-selective and conductivity-selective single-walled carbon nanotubes is provided, said catalysts have chemical compositions as represented by formula (I) as above and said method comprises the following steps:

Reducing the metal oxides with chemical compositions represented by formula (II) as follows to obtain the catalysts with chemical compositions represented by formula (I) as above in the atmosphere of hydrogen at 300-1500° C. with a temperature programmed heating rate of 10-100° C./min:

$$AB_yO_{(a+by)/2}, \quad \text{formula (II)}$$

wherein, A is the metal tungsten (W);

B stands for one or more metals selected from a group consisting of the transition metals vanadium (V), chromium (Cr), manganese (Mn), iron (Fe), cobalt (Co), nickel (Ni), copper (Cu), zinc (Zn), rhodium (Rh), ruthenium (Ru), palladium (Pd), platinum (Pt), gold (Au), silver (Ag), rhenium (Re), osmium (Os), iridium (Ir), and the lanthanide rare earth metals;

a is the oxidation number in A;

b is the oxidation number in B;

y is in the range of 0.01-20.0.

In a preferred embodiment, in formula (II) B stands for one or more metals selected from a group listed as follows: transition metals manganese (Mn), iron (Fe), cobalt (Co), nickel (Ni), copper (Cu), zinc (Zn), chromium (Cr), vanadium (V), rhodium (Rh), and ruthenium (Ru); more preferably, B stands for one or more metals selected from a group listed as follows: manganese (Mn), iron (Fe), cobalt (Co), nickel (Ni), copper (Cu), zinc (Zn), and chromium (Cr); most preferably, B stands for one or more metals selected from a group listed as follows: iron (Fe), cobalt (Co), nickel (Ni), copper (Cu), and chromium (Cr).

In a preferred embodiment, in formula (II) y is in the range of 0.1-6.0, preferably, 0.2-4.0, more preferably, 0.2-1.0.

The inventors find out by research that the preparation method is very important for the performance of the prepared catalysts. If using other preparation methods, the prepared catalysts show no specific chirality-selectivity and conductivity selectivity, and the reason for this is not clear at this stage.

In the described methods, hydrogen as a reductive gas is used to reduce the metal oxides in formula (II). As the reaction proceeds, metals A and B are reduced continuously and the compositions (alloys) with special structures, morphology and sizes are formed. The alloys with uniform structures and sizes are good catalysts in selective growth of single-walled carbon nanotubes, and can catalyze the growth of single-walled carbon nanotubes with desired chirality-selectivity and conductivity-selectivity.

In the preferred embodiments, the flow rate of hydrogen is in the range of 10-1000 ml/min, preferably, 20-600 ml/min, more preferably, 100-200 ml/min, most preferably, about 200 ml/min. If the flow rate of hydrogen is higher than 1000 ml/min, the reduction reaction will proceed unevenly due to the high flow rate of hydrogen, and the prepared compositions (alloys) show low catalytic selectivity. Contrariwise, if the flow rate of hydrogen is lower than 10 ml/min, the reduction reaction will proceed not thoroughly due to the low flow rate of hydrogen, and the slow reaction rate causes aggregations of the alloy particles, large size of the prepared alloys, and consequently poor catalytic selectivity.

In the described methods, the reduction temperature is in the range of 300-1500° C. If the reduction temperature is lower than 300° C., part of the metals will not be reduced due to low reduction temperature and will form single metal element particles with poor catalytic selectivity, and the intermetallic compounds (alloys) will not form. Contrariwise, if the reduction temperature is higher than 1500° C., the metals formed after reduction will vaporize (or melt) due to high temperature, and the element composition, structure and morphology of the alloys are not fixed, lowing the synergetic catalytic effects of different metals. In addition, if the reduction temperature is very high, the composition of the alloys will change, resulting in the existence of partial single metal elements and consequently lowing the catalytic performance. In the preferred embodiments, the reduction temperature is in the range of 900-1100° C., more preferably, about 1000-1100° C.

In the described methods, temperature programmed heating is a key factor in achieving good performance of the prepared catalysts. In the present invention, the terminology "temperature programmed heating" refers to heating at a temperature programmed heating rate. For the entire heating process, it may comprise one or more temperature programmed heating stages, preferably, the entire heating process only contains one temperature programmed heating stage, i.e., the heating rate in the entire heating process is constant. If the entire heating process comprises multiple temperature programmed heating stages, the heating rates are different in each temperature programmed heating stages. In the present invention, the heating rate is in the range of 10-100° C./min, preferably, 10-80° C./min, more preferably, 10-60° C./min, most preferably, 40-60° C./min.

The metal oxides with chemical compositions represented by formula (II) can be obtained by calcination of the solutions containing element A and element B, preferably, at 200-900° C., more preferably, at 500-700° C. The calcination is done in oxygen-present conditions, such as in air or in oxygen. There is no specific limit in calcination time, however, it is preferably no less than 2 min, more preferably, 3-10 min.

The solutions containing element A and element B can be made by known methods listed as below:

(1) Obtaining the binary or multiple metal salt mixtures and dissolving them in water/ethanol solutions by mixing the sodium salt of tungsten and the chlorides of metal B with the desired ratio and grinding them thoroughly;

(2) Hydrolysis under a certain temperature of the stirring mixed salt solutions of tungsten and metal B;

(3) Dissolving in a solvent such as water and ethanol mixture solvent the crystalline compounds of tungsten and metal B after the reaction at a certain pH of the salt solution mixtures of tungsten-containing compounds such as tungstate and metal B, followed by evaporation, crystallization and filtration.

For the above known methods, the references include *Dalton Trans.*, 2010, 39, 3884; *Chem. Mater.*, 2005, 17, 1367; *Appl. Catal. A: Gen.*, 1998, 172, 265; *Inorg. Chem.*, 2010, 49, 4949; *Chem. Eur. J.*, 2008, 14, 1186; *Inorg. Chem.*, 2009, 48, 6452; *Dalton Trans.*, 2010, 39, 6460; *Angew. Chem. Int. Ed. Engl.* 1997, 36, 1445; *J. Am. Chem. Soc.* 2010, 132, 11410; *Chem. Asian. J.* 2006, 1, 352; *Chem. Commun.* 2007, (41), 4254; *Chem. Eur. J.* 2008, 14, 1186; *Dalton Trans.* 2010, 39 (28), 6460; *Inorg. Chem.* 2009, 48, 6452; *Inorg. Chem.* 2011, 50 (1), 136; *Angew. Chem. Int. Ed.* 2005, 44, 3072; *Angew. Chem. Int. Ed.* 2010, 49, 6984; *Angew. Chem. Int. Ed.* 2008, 47, 6881; *J. Am. Chem. Soc.* 2007, 129, 7016.

The possible reason why the catalysts provided in the present invention can catalyze the selective growth of single-walled carbon nanotubes with desired chirality-selectivity and conductivity-selectivity is that: for the binary or multiple metal alloys formed by tungsten and other transition metals, precious metals, or lanthanide rare earth metals, due to the very high melting point and boiling point of the metal tungsten, the melting point and boiling point of the alloys increase consequently, with the metal compositions of the alloys becoming nonvolatile and fixed, and the prepared alloy particles showing specific size, composition, and structure, therefore, the synergetic effects of tungsten and other metals play a key role in catalyzing the selective growth of single-walled carbon nanotubes.

However, it should be noted that the above mechanism is only a possible supposition, and the present invention is not limited to this mechanism.

As the third aspect of the present invention, the applications of the catalysts for preparation of chirality-selective and conductivity-selective single-walled carbon nanotubes are provided. Many experiments and researches are carried out by the present inventors and it is found out that direct growth of single-walled carbon nanotubes with desired chirality and conductivity can be achieved when the alloys with chemical compositions represented by formula (I) prepared by methods in the present invention are used as catalysts.

In particular, the present invention also provides a method for preparation of chirality-selective and conductivity-selective single-walled carbon nanotubes, said method comprises the following steps:

Growing single-walled carbon nanotubes on substrates loaded with the catalysts described above by introducing carbon sources with a flow rate of 10-1000 ml/min of the carbon sources with the carrier gas at 600-1500° C., and by chemical vapor deposition.

In the described methods, the temperature for growing single-walled carbon nanotubes by chemical vapor deposition is in the range of 600-1500° C., preferably, 800-1300° C., more preferably, 900-1100° C. In the above temperature range, desired single-walled carbon nanotubes can be prepared. If the temperature is lower than 600° C., the carbon sources will decompose into amorphous carbon or form multi-walled carbon nanotubes due to the low growth temperatures. Contrariwise, if the temperature is higher than 1500° C., the activity of the catalysts will decrease due to the high growth temperatures, consequently affecting the catalytic effect, lowering the chirality and conductivity selectivity, and furthermore, causing rapid decomposition of the carbon sources under high temperatures, and poisoning the catalysts, which is beneficial for the nucleation and growth of carbon nanotubes.

In the described methods, the flow rate for the carbon sources is in the range of 10-1000 ml/min, preferably, 10-800 ml/min, more preferably, 50-200 ml/min. If the flow rate of the carbon sources is within this range, single-walled carbon nanotubes with desired chirality-selectivity and conductivity-selectivity can be prepared. If the flow rate of the carbon sources is higher than 1000 ml/min, the high carbon feeding rate will cause catalyst poisoning by the formed amorphous carbon. Contrariwise, if the flow rate of the carbon sources is lower than 10 ml/min, the low carbon feeding rate will not satisfy the growth of carbon nanotubes with specific chirality and conductivity.

In the described methods, there are no special limits for the carbon sources. It can be common carbon source gases in the art, such as organics with low molecular weights including methanol, ethanol, methane, ethane, acetylene, etc.

In the described methods, the carbon sources gases can be introduced by carrier gases. There are no special limits for the carrier gases. It can be common carrier gases for carbon source gases in the art, such as inert gases including nitrogen, noble gases (helium, neon, argon, etc.), which being not described herein. The flow rate of the carrier gases can be chosen as needed, such as in the range of 50-200 ml/min. As replacement, the carrier gases can be unnecessary and the carbon source gases can be introduced directly.

In the described methods, the substrates can be common flat, high temperature-resisting metal substrates or nonmetal substrates in the art.

In the described methods, there are no special limits for the growth time, as far as single-walled carbon nanotubes with desired chirality-selectivity and conductivity-selectivity can be prepared. However, the growth time is preferably in the range of 5-30 min, more preferably, 15-25 min. This is because the growth of single-walled carbon nanotubes is not finished if the growth time is too short, and the reaction materials and time are wasted if the growth time is too long.

In the described methods, there are no special limits for the reaction container for the chemical vapor deposition. It can be common reaction container in the art, such as quartz tubes.

After the growth process is finished, post-reaction treatments are performed, such as cooling in the atmosphere of reductive gases including hydrogen and/or inert gases. Those post-reaction treatments are well known in the art and thus are not listed herein.

Single-walled carbon nanotubes with desired chirality-selectivity and conductivity-selectivity on substrates can be grown directly utilizing the above described methods, and can be used as desired surface electronic devices as needed.

EXAMPLES

The following examples are intended to further illustrate the present invention, and the examples provided should not be understood as limiting the protective scope of the present invention.

Example 1

Selective Growth of Semiconducting Single-Walled Carbon Nanotubes Using Tungsten-Cobalt Catalysts 1.5 g $K_{12}[H_2P_2W_{12}O_{48}] \cdot 24H_2O$ is weighted and dissolved in 75 ml distilled water. Then 0.125 g $Na_2WO_4 \cdot 2H_2O$ and 1.0 g NaCl is added to the solution with stirring. Then the value of pH is adjusted to 1.0 with 4.0 mol·dm$^{-3}$ HCl. After stirred for 8 h, the solution is filtered. The filtered solution is kept at room temperature for slow evaporation. Brown block crystals of $(Na_{18}[\{Co^{II}(H_2O)_4\}_6\{W^{IV}O(H_2O)\}_3(P_2W^{IV}_{12}O_{40})_3] \cdot xH_2O)$ is obtained through filteration and washing after two weeks, which is donated as $\{W_{39}Co_6\}$.

The $\{W_{39}Co_6\}$ is dissolved in a mixture of 10 ml water and 40 ml ethanol at a concentration of 0.1 mmol·dm$^{-3}$.

The precursor solution is dropped onto the monocrystalline silicon substrate in a quartz tube furnace, and the solvent is spread and volatilized quickly. The substrate is calcined at 700° C. in air for 2 min and then the tungsten-cobalt metal oxides are formed. Hydrogen is introduced to reduce the calcined catalyst precursors at temperatures of 950° C. with a temperature programmed heating rate of 50° C./min and then the WCo$_{0.15}$ an catalyst is formed.

A flow of hydrogen (100 cm$^3$/min) through an ethanol bubbler is introduced into the reactor to grow single-walled carbon nanotubes for 15 min at temperatures of 950° C. at the centre of the furnace.

At last, the system is cooled under the atmosphere of 100 ml/min hydrogen and 300 ml/min argon and then the single-walled carbon nanotubes are formed.

Figure 2:
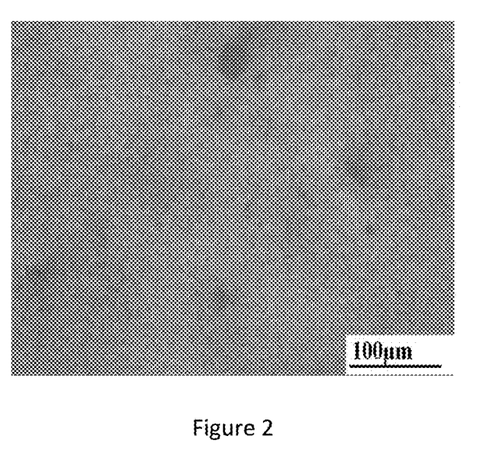
FIG. 2 is the scanning electron microscope image of the as-grown carbon nanotubes in example 1.

The scanning electron microscope (SEM) image of the as-grown single-walled carbon nanotubes is shown in FIG. 2. It is observed from FIG. 2 that the dense single-walled carbon nanotubes are randomly grown on the surface of silicon substrate.

Figure 4A:
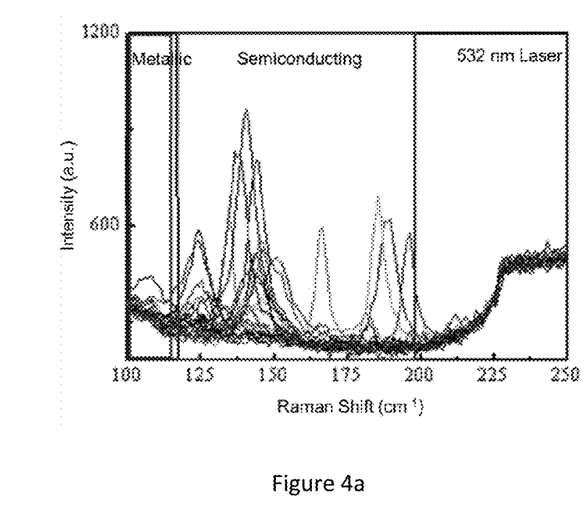
FIG. 4a is the Raman spectra of the as-grown carbon nanotubes in example 1 with 532 nm excitation wavelength.
Figure 4B:
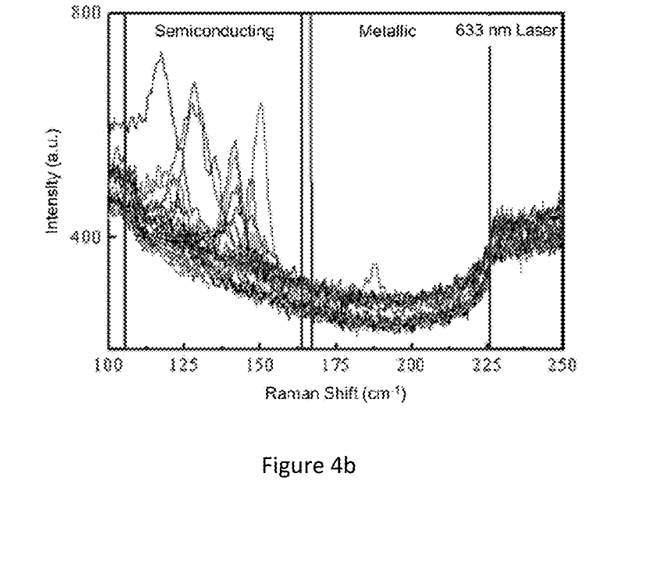
FIG. 4b is the Raman spectra of the as-grown carbon nanotubes in example 1 with 633 nm excitation wavelength.

The Raman spectra of the as-grown single-walled carbon nanotubes are shown in FIGS. 4a (excitation wavelength: 532 nm) and 4b (excitation wavelength: 633 nm). It shows high selectivity of semiconducting single-walled carbon nanotubes from FIGS. 4a and 4b.

Example 2

Growth of Chirality-Selective Single-Walled Carbon Nanotubes Using Tungsten-Cobalt Catalysts The growth of single-walled carbon nanotubes is similar as the methods described in Example 1. The difference is that a flow of argon (200 cm$^3$/min) through an ethanol bubbler mixed with 150 cm$^3$/min hydrogen instead of a flow of hydrogen (100 cm$^3$/min) through an ethanol bubbler is introduced into the system to grow single-walled carbon nanotubes at 1050° C. instead of 950° C.

Figure 3:
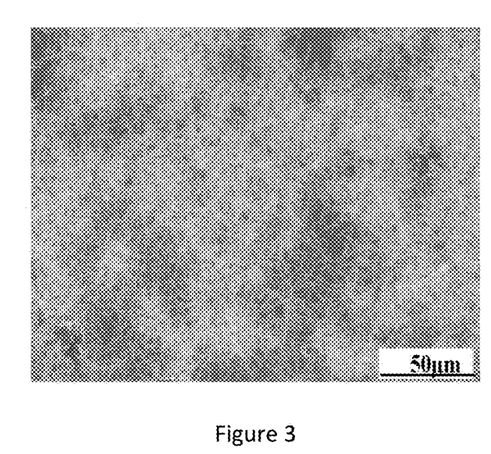
FIG. 3 is the scanning electron microscope image of the as-grown carbon nanotubes in example 2.

The scanning electron microscope (SEM) image of the as-grown single-walled carbon nanotubes is shown in FIG. 3. It is observed from FIG. 3 that the dense single-walled carbon nanotubes are randomly grown on the surface of silicon substrate.

Figure 5:
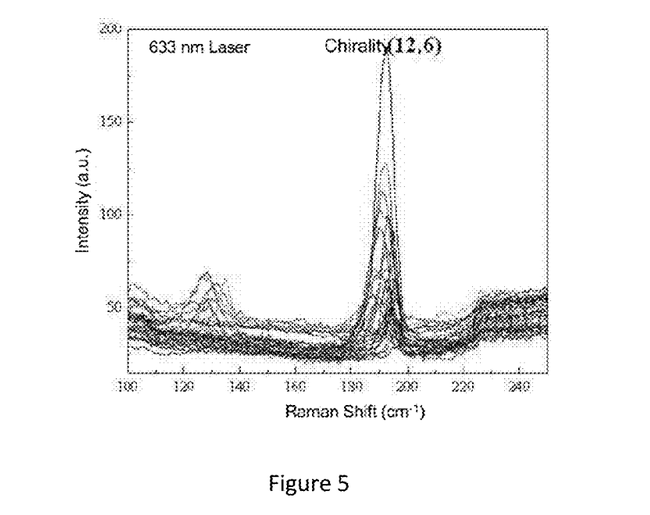
FIG. 5 is the Raman spectra of the as-grown carbon nanotubes in example 2.

The Raman spectra of the as-grown single-walled carbon nanotubes are shown in FIG. 5 (excitation wavelength: 633 nm). It shows high chirality selectivity of single-walled carbon nanotubes from FIG. 5.

The radical breathing mode (RBM) of single-walled carbon nanotubes can be detected from Raman spectrum, which usually locates in the range of 100-400 cm$^{-1}$. Each RBM frequency corresponds to a specific diameter and chirality of single-walled carbon nanotubes. The uniform RBM frequency at 197 cm$^{-1}$ (excitation wavelength: 633 nm) can be assigned to (12,6) nanotube. Only very few other RBM frequencies (chiralities) coexist in this sample. This demonstrates a high abundance of (12,6) single-walled carbon nanotubes in this sample.

Example 3

Selective Growth of Semiconducting Single-Walled Carbon Nanotubes Using Tungsten-Cobalt Catalysts The growth of single-walled carbon nanotubes is similar as the methods described in Example 1. The difference is that a flow of hydrogen (50 cm$^3$/min) through an ethanol bubbler instead of a flow of hydrogen (100 cm$^3$/min) through an ethanol bubbler is introduced into the system to grow single-walled carbon nanotubes at 1200° C. instead of 950° C.

Example 4

Selective Growth of Semiconducting Single-Walled Carbon Nanotubes Using Tungsten-Nickel Catalysts 0.0029 g Na$_2$WO$_4$ and 0.0018 g Ni(NO$_3$)$_2$ are weighted as solid and dissolved in a mixed solution of 10 ml water and 40 ml ethanol at a concentration of 0.2 mmol·dm$^{-3}$, which is calculated on the basis of nickel.

The precursor solution is dropped onto the monocrystalline silicon substrate in a quartz tube furnace, and the solvent is spread and volatilized quickly. The substrate is calcined at 900° C. in air for 3 min and then the tungsten-nickel metal oxides are formed. Hydrogen is introduced to reduce the calcined catalyst precursors at temperatures of 1000° C. with a temperature programmed heating rate of 10° C./min, and then the WNi catalysts are formed.

A flow of hydrogen (200 cm$^3$/min) through an ethanol bubbler is introduced into the reactor to grow single-walled carbon nanotubes for 15 min at temperatures of 1000° C. at the centre of the furnace.

At last, the system is cooled under the atmosphere of 100 ml/min hydrogen and 300 ml/min argon, and then the single-walled carbon nanotubes are formed.

Example 5

Selective Growth of Metallic Single-Walled Carbon Nanotubes Using Tungsten-Manganese-Vanadium Catalysts 0.0058 g Na$_2$WO$_4$, 0.0052 g Mn(Ac)$_2$, and 0.0023 g Na$_3$VO$_4$ are weighted as solid and dissolved in a mixed solution of 10 ml water and 40 ml ethanol at a concentration of 0.4 mmol·dm$^{-3}$, which is calculated on the basis of tungsten.

The precursor solution is dropped onto the monocrystalline silicon substrate in a quartz tube furnace, and the solvent is spread and volatilized quickly. The substrate is calcined at 800° C. in air for 5 min and then the tungsten-manganese-vanadium metal oxides are formed. Hydrogen is introduced to reduce the calcined catalyst precursors at temperatures of 1400° C. with a temperature programmed heating rate of 50° C./min, and then the WMn$_{1.5}$W$_{0.63}$ catalysts are formed.

Then the tube furnace is cooled to 800° C. A flow of argon (500 cm$^3$/min) through an ethanol bubbler mixed with hydrogen (300 cm$^3$/min) is introduced into the reactor to grow single-walled carbon nanotubes for 15 min at temperatures of 800° C. at the centre of the furnace.

At last, the system is cooled under the atmosphere of 100 ml/min hydrogen and 300 ml/min argon, and then the single-walled carbon nanotubes are formed.

Example 6

Growth of Chirality-Selective Single-Walled Carbon Nanotube Horizontal Arrays Using Tungsten-Lanthanum-Iron Catalysts 0.029 g Na$_2$WO$_4$, 0.033 g La(NO$_3$)$_3$, and 0.048 g FeCl$_3$ are weighted as solid and dissolved in a mixed solution of 10 ml water and 40 ml ethanol at a concentration of 2.0 mmol·dm$^{-3}$, which is calculated on the basis of tungsten.

The precursor solution is dropped onto the quartz substrate ((110) crystal orientation) in a quartz tube furnace, and the solvent is spread and volatilized quickly. The substrate is calcined at 900° C. in air for 5 min then the tungstenlanthanum-iron metal oxides are formed. Hydrogen was introduced to reduce the calcined catalyst precursors at temperatures of 1500° C. with a temperature programmed heating rate of 100° C./min, and then the WLaFe$_3$ catalysts are formed.

Then the tube furnace is cooled to 650° C. A flow of argon (800 cm$^3$/min) through an ethanol bubbler mixed with hydrogen (800 cm$^3$/min) is introduced into the reactor to grow single-walled carbon nanotubes for 30 min at temperatures of 650° C. at the centre of the furnace.

At last, the system is cooled under the atmosphere of 100 ml/min hydrogen and 300 ml/min argon, and then the single-walled carbon nanotubes are formed.

Figure 8:
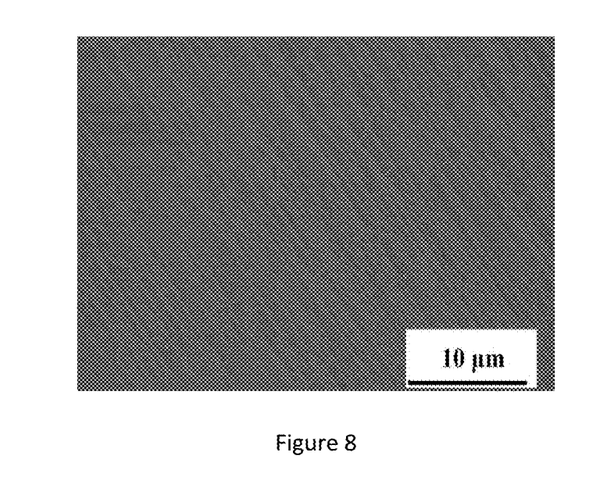
FIG. 8 is the scanning electron microscope image of the as-grown single-walled carbon nanotubes horizontal arrays in example 6.

The scanning electron microscope (SEM) image of the as-grown single-walled carbon nanotubes horizontal arrays is shown in FIG. 8. It is observed from FIG. 8 that dense horizontal arrays of single-walled carbon nanotubes are grown on the surface of quartz.

Comparative Example 1

The tungsten-cobalt WCo$_{1.17}$ and WCo$_3$ alloys, which are prepared based on the reference *Z. Anorg. Chem.* 1938, 238, 270, are deposited on monocrystalline silicon substrate, respectively. The catalysts are put into the centre of the quartz tube furnace. A flow of hydrogen (100 cm$^3$/min) through an ethanol bubbler is introduced into the reactor to grow single-walled carbon nanotubes for 15 min at temperatures of 950° C. at the centre of the furnace.

At last, the system is cooled under the atmosphere of 100 ml/min hydrogen and 300 ml/min argon, and then the single-walled carbon nanotubes are formed.

Figure 6:
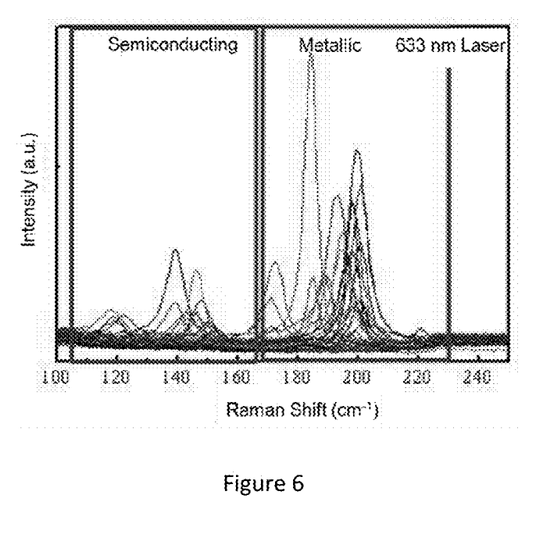
FIG. 6 is the Raman spectra of the as-grown carbon nanotubes in comparative example 1.

The Raman spectra of the as-grown single-walled carbon nanotubes are shown in FIG. 6 (excitation wavelength: 633 nm). It is observed from FIG. 6 that both semiconducting and metallic single-walled carbon nanotubes coexist in the sample. Therefore, there is no conductivity selectivity in this comparative example.

Comparative Example 2

The tungsten-nickel WNi$_4$ alloy, which is prepared based on the reference *J. Met.* 1949, 1, 267, is deposited on the monocrystalline silicon substrate. The catalysts are put into the centre of the quartz tube furnace. A flow of hydrogen (200 cm$^3$/min) through an ethanol bubbler is introduced into the reactor to grow single-walled carbon nanotubes for 15 min at temperatures of 1000° C. at the centre of the furnace.

At last, the system is cooled under the atmosphere of 100 ml/min hydrogen and 300 ml/min argon, and then the single-walled carbon nanotubes are formed.

Figure 7:
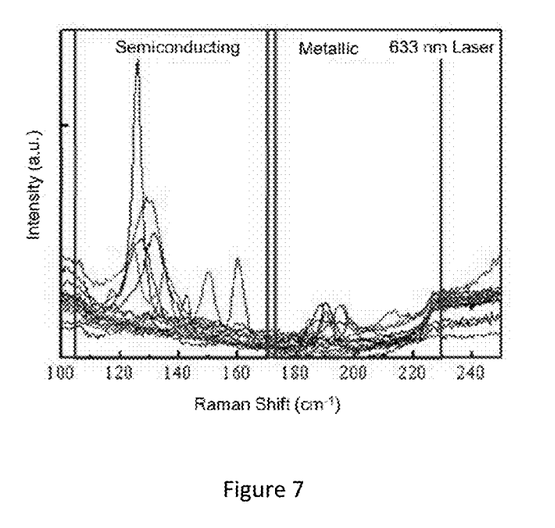
FIG. 7 is the Raman spectra of the as-grown carbon nanotubes in comparative example 2.

The Raman spectra of the as-grown single-walled carbon nanotubes are shown in FIG. 7 (excitation wavelength: 633 nm). It is observed from FIG. 7 that both semiconducting and metallic single-walled carbon nanotubes coexist in the sample. Therefore, there is no conductivity selectivity in this comparative example.

Experimental Example

The tungsten-cobalt catalyst powder prepared from example 1 is supported on SiO$_2$ microspheres by incipient wetness impregnation at a weight content of 10 wt. %. The powder is dispersed in a mixed solution of 10 ml water and 40 ml ethanol. The catalyst solution is dropped onto the monocrystalline silicon substrate in a quartz tube furnace, and the solvent is spread and volatilized quickly. The substrate is calcined at 700° C. in air for 3 min then the tungsten-cobalt metal oxides are formed. Hydrogen is introduced to reduce the calcined catalyst precursors at temperatures of 1030° C. with a temperature programmed heating rate of 50° C./min, and then the WCo catalysts supported on the SiO$_2$ microspheres are formed.

X-Ray Diffraction (XRD) of the Catalysts

Figure 9:
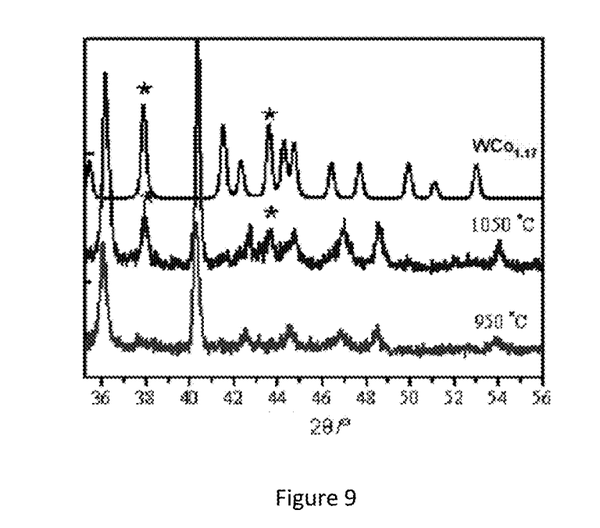
FIG. 9 is the X-ray powder diffraction (XRD) pattern of the as-grown catalysts in the experimental example.

The as-prepared tungsten-cobalt catalysts supported on the SiO$_2$ microspheres are measured by the XRD, which is performed from 10° to 80°, and the result is shown in FIG. 9.

It is observed from FIG. 9 that the (1 1 0) (2θ=38°) peak of WCo$_{1.17}$ alloy appears at 1050° C. The WCo alloy is formed at 1050° C.

High Resolution Transition Electron Microscopy (HR-TEM) of the Catalysts

The precursor {W$_{39}$Co$_6$} in example 1 is dissolved in a mixed solution of 10 ml water and 40 ml ethanol at a concentration of 0.1 mmol·dm$^{-3}$. The precursor solution is dropped onto the Si$_3$N$_4$ substrate (thickness: 200 nm), and the solvent is volatilized. The substrate is calcined at 700° C. in air for 2 min, and then the tungsten-cobalt metal oxides are formed. Hydrogen is introduced to reduce the calcined catalyst precursors at temperatures of 1050° C. with a temperature programmed heating rate of 50° C./min, and then the WCo catalysts are formed.

Figure 10:
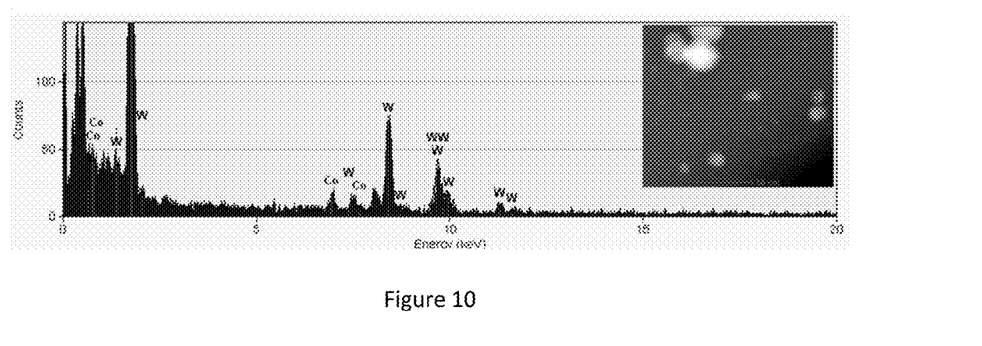
FIG. 10 is the elemental analysis spectrum from high resolution transmission electron microscope of the as-grown catalysts in the experimental example.

The electron dispersed x-ray (EDX) analysis of the nanoparticles of WCo binary metal catalysts after reduction is shown in FIG. 10. The EDX analysis shows that both tungsten and cobalt elements coexist in the catalyst nanoparticles.

Figure 11:
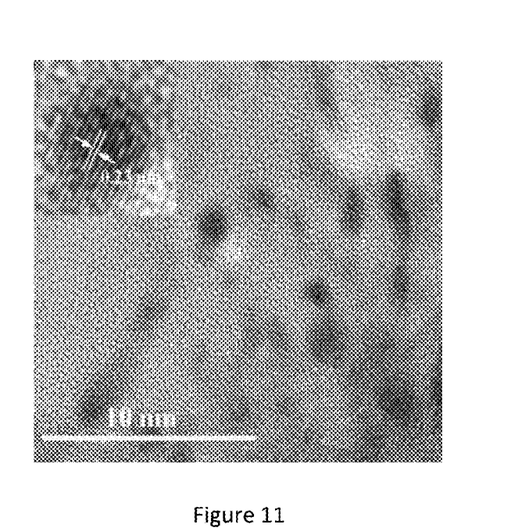
FIG. 11 is the high resolution transmission electron microscope (HRTEM) image of the as-grown catalysts in the experimental example.

The HRTEM image is shown in FIG. 11. It is observed from FIG. 11 that the nanoparticle's lattice fringe of 0.23 nm in the HRTEM image is in well accordance with the (1 1 0) plane distance (0.235 nm) of alloy WCo$_{1.17}$ in standard card database (Reference: *Z. Anorg. Chem.* 1938, 238, 272), which matches well with the (1 1 0) diffraction peak of catalysts in the XRD pattern of FIG. 6. It shows that WCo alloy is formed after the reduction by hydrogen in 1050° C.

Therefore, both XRD and HRTEM measurements show that WCo alloy is formed after the reduction by hydrogen in 1050° C.

The invention has been already illustrated according to the above preferred embodiments and examples. The foregoing illustration should not be understood as limiting the protective scope of the present invention. It will be appreciated that numerous replacements, modifications or improvements may be devised by the skilled in the art without deviating the spirit and scope of the invention. Such modifications are also understood to fall within the scope of the invention, which is defined in the attached claims.

Various reference literatures cited in the present disclosure, are hereby fully cited as references.

What is claimed is:

1. A method for preparing for a catalyst for preparing chirality-selective and conductivity-selective single-walled carbon nanotube, it reduces a metal oxide that is represented by AB$_y$O$_{(a+by)/2}$ formula (II), wherein, A is the metal tungsten (W); B is one or more metals selected from a group consisting of vanadium (V), chromium (Cr), manganese (Mn), iron (Fe), cobalt (Co), nickel (Ni), copper (Cu), zinc (Zn), rhodium (Rh), ruthenium (Ru), palladium (Pd), platinum (Pt), gold (Au), silver (Ag), rhenium (Re), osmium (Os), iridium (Ir), and a lanthanide rare earth metal; a is the oxidation number in A; b is the oxidation number in B; y is in the range of 0.01-20.0;

wherein said metal oxide is heated by increasing the temperature from 300 to 1500° C. at a rate between 10-100° C./min in the presence of hydrogen.

2. A process for preparing a conductivity-selective single-walled carbon nanotube by a catalyst, wherein the catalyst is represented by formula(I), $Ab_y$, which is prepared by the following method:

Reducing the metal oxides with chemical compositions represented by formula (II) as follows to obtain the catalysts with chemical compositions represented by formula (I) as above in the atmosphere of hydrogen at 300-1500° C. with a temperature programmed heating rate of 10-100° C./min:

$$AB_yO_{(a+by)/2},\qquad \text{formula (II)}$$

wherein, A is the metal tungsten (W);
B stands for one or more metals selected from a group consisting of vanadium (V), chromium (Cr), manganese (Mn), iron (Fe), cobalt (Co), nickel (Ni), copper (Cu), zinc (Zn), rhodium (Rh), ruthenium (Ru), palladium (Pd), platinum (Pt), gold (Au), silver (Ag), rhenium (Re), osmium (Os), iridium (Ir), and the lanthanide rare earth metals;
a is the oxidation number in A;
b is the oxidation number in B;
y is in the range of 0.01-20.0.

3. The process according to claim 2, wherein B stands for one or more metals selected from a group consisting of manganese (Mn), iron (Fe), cobalt (Co), nickel (Ni), copper (Cu), zinc (Zn), chromium (Cr), vanadium (V), rhodium (Rh), and ruthenium (Ru).

4. The process according to claim 2, wherein B stands for one or more metals selected from a group consisting of manganese (Mn), iron (Fe), cobalt (Co), nickel (Ni), copper (Cu), zinc (Zn), and chromium (Cr).

5. The process according to claim 2, B stands for one or more metals selected from a group consisting of iron (Fe), cobalt (Co), nickel (Ni), copper (Cu), and chromium (Cr).

6. The process according to claim 2, wherein y is in the range of 0.1-6.0.

7. The process according to claim 2, wherein said catalyst is selected from a group consisting of WV, $WFe_{1.17}$, $WFe_2$, WFe, $WCo_{1.17}$, $WCo_3$, WCo, WNi, $WNi_4$, $WNi_{5.67}$, $WCu_{0.67}$, $WCu_{5.25}$, WRe, $WRe_3$, $WRe_{0.25}$, $WRe_{10.11}$, $W_{13}Re_7$, $WOs_{0.5}$, $WOs_2$, WIr, $WPt_2$, $WRh_3$, $WRh_4$, $WRu_{0.18}$, $WRu_{1.5}$, $WEu_{0.18}$, $WCe_3$, $WPr_3$; WCoNi, $WFeNi_5$, $WMn_3Fe$, $WPtNi_{10}$, $WRu_2Fe_5$, WRhCo, $WCu_2Fe_{12}$, $WFeV_4$, $WRe_{0.125}Ni_{0.125}$, $WRu_3Cu_{12}$, $WPtCu_{10}$, $WMn_{1.5}V_{0.63}$, $WLaFe_3$; WFeCoNi, WFeCoMn, $WFeCu_3Ru$, $WMn_5V_3Cr$, WRuPtAu, $WFe_{0.1}Au_{0.2}Mn_{0.1}$, $WFeRe_2Mn$, $WOsCu_3Mn_8$.

* * * * *